United States Patent [19]

Roberts

[11] 4,316,829

[45] Feb. 23, 1982

[54] MODIFIED ASPHALT COMPOSITIONS

[75] Inventor: Michael G. Roberts, Heath, Ohio

[73] Assignee: Owens-Corning Fiberglas Corporation, Toledo, Ohio

[21] Appl. No.: 191,053

[22] Filed: Sep. 25, 1980

[51] Int. Cl.³ .............................................. C08L 95/00
[52] U.S. Cl. ...................... 260/28.5 AS; 106/273 R; 106/273 N; 106/278; 106/279; 106/282
[58] Field of Search ................. 260/28.5 AS; 106/278-284, 273 R, 273 N, 122

[56] References Cited

U.S. PATENT DOCUMENTS

| | | | |
|---|---|---|---|
| 3,349,051 | 10/1967 | Alexander et al. | 260/28.5 AS |
| 3,900,692 | 8/1975 | Rostler | 106/278 |
| 3,994,735 | 11/1976 | Ishihara et al. | 106/279 |
| 4,166,752 | 9/1979 | Marzocchi et al. | 260/28.5 AS |
| 4,251,586 | 2/1981 | Marzocchi et al. | 260/28.5 AS |
| 4,273,588 | 6/1981 | Marzocchi et al. | 260/28.5 AS |
| 4,273,685 | 6/1981 | Marzocchi et al. | 260/28.5 AS |

FOREIGN PATENT DOCUMENTS 2015002  9/1979  United Kingdom ........ 260/28.5 AS

*Primary Examiner*—H. S. Cockeram
*Attorney, Agent, or Firm*—Ronald C. Hudgens; Robert F. Rywalski; Keith V. Rockey

[57] ABSTRACT

A chemically-modified asphalt composition formed by reaction of asphalt and a polymerizable aromatic monomer followed by reaction with a polyester. Alternatively, the impact strength of the chemically-modified asphalt composition can be increased by carrying out the latter reaction in the presence of a rubbery polymer. The composition is non-tacky relative to the asphalt and can be cross-linked with a vulcanizing agent to form rigid bodies which can be chemically bonded to reinforcements and fillers, specifically including glass fibers.

10 Claims, No Drawings

MODIFIED ASPHALT COMPOSITIONS

This invention relates to chemically-modified asphalt compositions, and more specifically to asphalt compositions which have been chemically modified with a polyester resin after the asphalt is prereacted with a polymerizable vinyl aromatic monomer to impart increased rigidity to the asphalt and to promote compatibility between the asphalt and reinforcements therefor.

As is well known to those skilled in the art, asphalt is a bituminous material which contains bitumens occurring in nature or bitumens obtained as the residue in the refining of petroleum. Generally, asphalt is made up of condensed hydrocarbon rings which contain various reactive groups, and notably carbon-to-carbon double bonds as well as hydroxy groups, carboxy groups and like functional groups. In terms of distribution, asphalt is much like a plastisol in that it is formed of graphitic particles suspended in a viscous liquid. The particles are of the same chemical type, but differ from each other primarily in molecular weight. Thus, the liquid phase of the asphalt is formed predominantly of lower molecular weight condensed hydrocarbon rings, whereas the graphitic particles suspended therein are made up of high molecular weight condensed hydrocarbon rings.

Asphalt has been used for many years in road-paving applications, as well as many other uses calling for strong, inert physical and chemical properties, including applications in roofing and the like. Perhaps the most extensive field of use for asphalt now resides in road-paving applications in which the asphalt is modified with fillers, and specifically glass fibers and flake which are combined with the asphalt or asphalt plus aggregate to increase the strength and wear resistance of road pavements.

One of the difficulties, however, in combining glass, either in the form of glass fibers or in the form of fragments of glass, such as glass flake, stems from the fact that the glass is highly hydrophilic in nature. Asphalt, on the other hand, is a highly hydrophobic material, since it is a petroleum derivative. Thus, there exists a basic incompatibility between glass and asphalt by reason of their chemical natures. For that reason, it has been difficult to establish any bond, either physical or chemical, between asphalt and glass fillers and/or reinforcements.

One of the other advantages of asphalt stems from the fact that it is a durable material which is, for the most part, highly inert chemically. Thus, asphalt has numerous desirable characteristics from the standpoint of use in the manufacture of moldable and extrudable structural members, but one significant drawback exists. Specifically, asphalt tends to be tacky, and hence unsuitable for use in the manufacture of such structural members.

It is known, as is described in U.S. Pat. No. 4,008,095, that asphalt can be modified by blending with various materials including coal or synthetic elastomers and petroleum resins. One of the difficulties with the techniques of the sort described in that patent arises from the fact that the resulting blend of asphalt with an elastomeric or resinous modifying agent is not homogeneous, but tends to separate into an asphalt and a modifying agent phase. Without limitation as to theory, it is believed that the reason for such separation arises from the fact that resinous modifying agents are not chemically bonded to the asphalt. As a result, it is difficult to obtain a homogeneous system by simply blending a modifying agent with the asphalt. That difficulty is compounded when it is desired to reinforce asphalt systems with fillers such as glass fibers and flake; such reinforcing fillers seem to enhance separation of the various components from the asphalt system.

In addition, the combination of asphalt polyester molding systems is well known. The amount of asphalt which can be blended with a polyester, however, is limited by the fact that the asphaltic constituents inhibit the cross linking reaction so that the cross linking reaction is incomplete and an improperly cured material results when the resin cross linking is attempted thermally or by an initiator. That this inhibition of the reaction is related to the unsaturation of the polyester rather than to termination of the styrene radicals has been illustrated by the reaction of styrene in asphalt over a wide range of conditions. It is suspected that the inhibition results from a termination of radicals formed on the unsaturated species of the polyester backbone.

It is accordingly an objective of this invention to provide a chemically-modified asphalt system which overcomes the disadvantages described above.

It is a more specific objective of the invention to provide a chemically-modified asphalt where the asphalt molecules are chemically combined with a polyester resin to thereby improve the rigidity of the resulting modified asphalt, to reduce its tackiness and to provide in the chemically-modified asphalt reaction sites which facilitate the bonding of the chemically-modified asphalt to reinforcements therefor, including glass fibers and/or glass flake.

The concepts of the present invention reside in a chemically-modified asphalt composition prepared by prereaction of asphalt with a vinyl aromatic monomer followed by reaction with a polyester.

It has been found, in accordance with the practice of this invention, that the polyester is chemically integrated with the asphalt prereacted with a vinyl aromatic monomer so as to substantially minimize or prevent the compatibility problem experienced by prior art blends of asphalt and thermoplastic resins. It has also been found that the polyester resin-asphalt composite can be cross linked, the inhibition of the cross linking reaction which occurs when polyester resins are blended with asphalt being substantially mitigated through the use of a vinyl aromatic monomer to promote the reaction between the asphalt and the polyester resin. The chemically-modified asphalt of the invention can thus be cross linked to substantially eliminate the tacky characteristics common to most asphalts or blends of asphalts with polyester resins, and hence the chemically-modified asphalt of the present invention can be used as a moldable material.

In the preferred practice of the present invention, the polyester resin is one which contains ethylenic unsaturation. Without limiting this embodiment as to theory, it is believed that the ethylenic unsaturation of the polyester resin is capable of interreaction with the product of the reaction of the vinyl aromatic monomer and the ethylenic unsaturation present in the asphalt whereby the vinyl aromatic compound reacts with the ethylenic unsaturation of the polyester resin to chemically integrate the polyester resin with the modified asphalt.

In accordance with another embodiment of the invention, however, it is not essential that the polyester resin contain ethylenic unsaturation. For example, the polyester resin can contain terminal carboxy groups and/or terminal hydroxy groups which are reactive with hydroxy and carboxy groups, respectively, which are present in the asphalt. Thus, in accordance with this embodiment of the invention, the polyester resin is chemically integrated with the asphalt by reaction of a terminal functional group of the polyester resin with a functional group contained in the asphalt with which the polyester resin terminal group is reactive. In this embodiment, the presence of the vinyl aromatic monomer is still essential since it is capable of copolymerization with the asphalt and to eliminate the tendency of the asphalt to inhibit cross-linking of the polyester resin.

In the practice of the invention, use is made of an asphalt in the form of ordinary asphalt or an asphalt which has been modified by reaction in the presence of air (e.g., blown asphalt), steam, ammonia or organic amines as described in application Ser. No. 852,898, filed Nov. 18, 1977, and now U.S. Pat. No. 4,166,752.

The polyesters employed in the practice of the invention are conventional resins prepared by condensation of a polycarboxylic acid or anhydride and a polyol.

As to the polycarboxylic acid or anhydride, use is made of an organic acid or anhydride containing 2 to 25 carbon atoms and 2 to 4 carboxyl groups, when the material is in the acid form. Preferred are acids having the general formula:

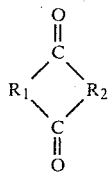

wherein $R_1$ is a divalent organic group containing 1 to 25 carbon atoms, including an alkenylene or an arylene group and $R_2$ is O or a pair of OH groups, each of which is bonded to the carboxyl groups when the compound is in an acid form. Examples of suitable carboxylic acids and anhydrides include oxalic acid, malonic acid, succinic acid, glutaric acid, maleic anhydride, glutaconic acid, adipic acid, suberic acid, 1,2,3-propene tricarboxylic acid, phthalic acid, terephthalic acid, terephthalic anhydride, 1,3,5-benzene tricarboxylic acid, naphthalic acid, 3,5-peridene dicarboxylic acid, 3,4-quinoline dicarboxylic acid, etc. Maleic anhydride is preferred.

As to the polyalcohol, use is made of an organic, polyester-forming polyalcohol containing 2 to 20 carbon atoms and 2 to 4 hydroxyl groups. In general, such polyalcohols having the general formula:

$$HO-R_3-OH$$

where $R_3$ is a divalent group containing 2 to 20 carbon atoms. $R_3$ thus can be an alkylene group, or an alkenylene group. In addition, $R_3$ can be an alkyleneoxyalkylene group such as those derived from glycols. Preferred polyalcohols include ethylene glycol, diethylene glycol, triethylene glycol, glycerol and a variety of other polyalcohols conventionally used in the preparation of polyesters.

Relative proportions of the acid or anhydride and polyalcohol relative to the asphalt are not critical, and can be varied within the generally cited ranges. Best results are usually achieved when the moles of the acid or anhydride is within the range of 0.5 to 1.5 based on the moles of acid employed.

In the preferred practice of the invention, use is made of a vinyl monomer having the general formula:

$$CH_2=CH-R$$

wherein R is an aromatic group such as a phenyl group or a substituted phenyl group wherein the substituent is any of the following groups: amino, cyano, halogen, $C_1$-$C_3$ alkoxy, $C_1$-$C_3$ alkyl, hydroxy, nitro, etc. R can also be a heterocyclic aromatic group such as a pyridyl group, a quinolyl group or the like. In general, R is an aromatic group containing 6 to 12 carbon atoms.

Preferred is styrene, although various other polymerizable vinyl aromatic monomers can be used. Included are p-aminostyrene, o-methoxystyrene, hydroxystyrene, mercaptostyrene, 2-vinyl pyridine, 3-vinyl quinoline, etc.

Other suitable polyesters for use in the present invention include: poly(vinyl acetate), poly(vinyl laurate), poly(vinyl palmitate), poly(methyl acrylate), poly(ethyl acrylate), poly(methyl methacrylate), poly(lauryl methacrylate), poly(hexamethylene furmarate), poly(hexamethylene maleate), poly(hexamethylene sebacate), poly(hexamethylene acetylene dicarboxylate) and poly(p-phenylene isophthalate). In another embodiment of the invention, a polyamide can be used in place of the polyester. Representative polyamides which produce the desired non-tacky asphalt composition include poly(hexamethylene adipamide), poly(acrylamide) and poly methacrylamide. The use of a polyester, however, is preferred.

In the preferred practice of the invention, it also has been found that no catalyst is necessary to form the desired reaction product, it being sufficient that the asphalt be heated in the presence of the vinyl monomer followed by the addition of the polyester. Reaction temperatures within the range of 100° to 400° F. are generally employed, with higher reaction temperatures favoring more rapid reaction rates. If desired, prior to reaction the asphalt can be dissolved in an inert organic solvent such as an aromatic solvent, but the solvent is usually unnecessary. It is possible to carry out the reaction under non-oxidizing conditions to avoid any combustion of the asphalt; a vacuum or inert gas in the reaction vessel can be used for that purpose, although it is not necessary.

In accordance with another concept of the invention, it has been found that the impact strength of the resulting chemically-modified asphalt can be increased when the reaction is carried out in the presence of a rubber polymer. It has been found that the reaction of the asphalt, modified with the vinyl aromatic monomer, polyester and the rubbery polymer leads to not only the chemical integration of the polyester resin to the asphalt matrix, but also the chemical integration of the rubbery polymer with the asphalt as well. Suitable rubbery polymers useful in accordance with this concept of the invention are described in detail in copending application Ser. No. 45,047, filed June 4, 1979, the disclosure of which is incorporated herein by reference.

As described in that application, the rubbery polymer can be one of a number of elastomeric materials well known to those skilled in the art, such as natural rubbers and synthetic rubbers. Preferred are synthetic rubbers which are homopolymers of a conjugated diene (e.g., butadiene, isoprene, chloroprene, etc.) as well as other polymers which are substituted with a functional group containing a labile hydrogen atom. For example, various hydroxy, amino and like substituted homopolymers of conjugated dienes may be used.

Use can also be made of elastomeric materials formed by copolymerization of one or more ethylenic monomers such as styrene and hydroxy, amino and mercapto-substituted derivatives thereof, acrylonitrile, methacrylonitrile, acrylic acid, methacrylic acid, etc. Representative of such copolymers include butadiene-styrene rubbers, butadiene, acrylonitrile rubbers, butadiene-acrylonitrile rubbers, etc. Also suitable for use in the present invention are reclaimed rubbers as well as depolymerized rubbers.

The relative proportions of the various components of the reaction are not critical and can generally be varied within relatively broad limits. In general, the vinyl aromatic monomer is used in an amount ranging from 0.5 to 35% by weight based on the weight of the asphalt while the polyester resin is employed in an amount ranging from 5 to 75% by weight based on the weight of the asphalt. When a rubbery polymer is employed, it may be employed in an amount sufficient to increase to the desired extent of the impact strength of the resulting polyester. In general, the rubber component, when employed in the reaction, is present in an amount within the range of 1 to about 40% by weight based on the weight of the asphalt.

It has been found that the polyester-modified asphalt of the present invention can be subjected to curing and/or cross linking by means of conventional polyester curing agents. The polyester-modified asphalt composition is cross linked or cured to cause the composition to become rigid and completely non-tacky. For this purpose, use can be made of conventional curing agents such as free radical initiators, and preferably peroxide curing agents. Representative curing agents include benzoyl peroxide, dicornyl peroxide, etc.

The amount of the curing agent employed in the practice of this invention is not critical and can be varied within relatively wide limits. As a general rule, the amount of the curing agent employed is an amount sufficient to effect cure and/or cross linking of the polyester resin contained in the asphalt. Optimal results are usually achieved when the amount of the curing agent ranges from 1 to 20% based on the weight of the polyester component of the asphalt composition.

The asphalt compositions of this invention wherein asphalt has been chemically-modified with a polyester resin can be used in a variety of applications. For example, the asphalt compositions of the invention are highly suitable for use in road-paving applications, and particularly roadpaving applications wherein the asphalt is reinforced with glass, either in the form of glass fibers or in the form of glass frit or flake.

It has been found, for example, that the bonding relationship between the glass fibers and the polyester-modified asphalt can be facilitated where the glass has been treated with an organo silane anchoring agent of the type conventionally used in the treatment of glass fibers for use in the reinforcement of elastomeric materials. Without limiting the present invention as to theory, it is believed that such organo silanes as well as their corresponding silanols and siloxanes, become chemically bonded to the glass surfaces, thus leaving free for reaction with the polyester resin the functional group attached to the silane. Considering as illustrative, gamma-aminopropyltriethoxysilane, the amine group is thus available for reaction with functional groups within the polyester resin portion of the asphalt to thereby form a chemical bond between the resin-modified asphalt and the glass fibers combined therewith.

Because the asphalt compositions of this invention are rigid materials upon curing, these asphalt compositions also can be used in the manufacture of molded products, and particularly molded products in which glass fibers are employed as reinforcement. Thus, the asphalt composition of this invention forms a continuous phase in which the glass fibers, preferably glass fibers containing a thin film coating of an organo silicon compound as an anchoring agent, are distributed as reinforcement.

As used herein, the term "anchoring agent" refers to a number of organo silicon compounds well known to those skilled in the art which can be used to anchor the chemically-modified asphalt composition to glass, and preferably glass fibers, to promote a secure bonding relationship therebetween. In general, such organo silicon compounds include organo silanes containing 1–3 readily hydrolyzable groups and at least one organic group bonded directly to the silicon atom, with the organic group being substituted by one or more functional groups including an amino group, a mercapto group, a hydroxy group, a glycidoxy group, a carboxy group, an amide group, etc. Also included are organo silanes in which the organic group bonded directly to the silicon atom is unsaturated, such as a vinyl group, allyl group and the like. In addition to the silanes described above, use can also be made of compounds in their hydrolyzed form, that is the corresponding silanols or polysiloxane polymers. Such silanes are described in detail in, for example, U.S. Pat. No. 3,864,203.

In accordance with this concept of the invention, the organo silicon compound, and particularly the functional group contained in it, is capable of establishing a secure chemical bond between the chemically-modified asphalt composition of this invention and glass surfaces. Considering, for example, gamma-aminopropyltriethoxysilane as an example, glass fibers which have been coated preferably in forming, with a size composition containing gamma-aminopropyltriethoxysilane, contain on the glass fiber surfaces the silane bonded directly to the glass as schematically illustrated below:

Glass surface—Si—CH$_2$—CH$_2$—CH$_2$—NH$_2$

When such glass fibers are used as reinforcement for asphalt compositions of this invention, the free amino group which is chemically bonded directly to the glass fiber surfaces is capable of reaction with, for example, free carboxy groups or anhydride groups contained in the asphalt by reason of the reaction with the polyester.

Having described the basic concepts of the present invention, reference is now made to the following examples, which are provided by way of illustration and not by way of limitation of the practice of this invention in the preparation and use of asphalt compositions embodying the features of the invention.

EXAMPLE 1

This example illustrates the preparation of a polyester-modified asphalt composition embodying the concepts of this invention and its cure using benzoyl peroxide as a curing agent.

A sample of 100 parts by weight of asphalt is placed in a resin pot and heated to 110° C. as the pot is flushed with nitrogen. Thereafter, 12 parts by weight of styrene are added, and the reaction continued for 3 hours. Then, 20 parts by weight of a polyester prepared by reaction of propylene glycol and maleic anhydride are added, and the reaction mixture stirred at a temperature of 200° C. for 12 hours.

A sample weighing 50 grams of the foregoing asphalt-polyester copolymer is then placed in a resin pot and heated to 140° C. Thereafter, 5 parts by weight of benzoyl peroxide are added, and the resulting mixture is stirred at 140° C. for 30 hours.

The resulting polyester-modified asphalt is very hard and brittle.

EXAMPLE 2

Using the procedure of Example 1, a sample of 100 parts by weight of asphalt is reacted with 13 parts by weight of styrene and then 25 parts by weight of polyethylene terephthalate. After about 35 hours of reaction, the highly viscous polyester-modified asphalt is formed, and can be molded with glass fibers which have been coated in forming with a thin size film containing gamma-aminopropyltriethoxy-silane. Once molded into the desired configuration, the reinforced polyester-modified asphalt can be rendered hard and non-tacky by curing with a curing agent, and preferably a peroxide.

EXAMPLE 3

Using the procedure of Example 1, a sample of 100 parts by weight of asphalt (AC-20) is reacted with 15 parts by weight of styrene and then 15 parts by weight of the polyester described in Example 1 and 10 parts by weight of a synthetic butadiene-styrene rubber marketed by Philips Petroleum under the trademark Solprene 1205C.

The resulting polyester-modified asphalt is a highly viscous material which can be transformed into a hard yet resilient plastic material by the addition of a peroxide curing agent.

It will be understood that various changes and modifications can be made in the details of procedure, formulation and use without departing from the spirit of the invention, especially as defined in the following claims.

I claim:

1. A chemically-modified asphalt composition comprising the reaction product of (1) an asphalt which has been prereacted with a polymerizable vinyl aromatic monomer in an amount within the range of 0.5 to 35% by weight based on the weight of the asphalt and having the formula: $CH_2=CH-R$ wherein R is an aromatic group containing 6 to 12 carbon atoms and (2) a polyester in an amount within the range of 5 to 75% by weight based on the weight of the asphalt.

2. A composition as defined in claim 1 wherein the asphalt is an asphalt which has been prereacted with a modifying agent selected from the group consisting of steam, an oxygen-containing gas, ammonia and organic amines.

3. A composition as defined in claim 1 wherein the vinyl aromatic monomer is selected from the group consisting of styrene, aminostyrene, hydroxystyrene, mercaptostyrene, methoxystyrene, 2-vinyl pyridine and 3-vinyl pyridine.

4. A composition as defined in claim 1 wherein the asphalt is also reacted with a rubber in an amount within the range of 1 to 40% by weight based on the weight of asphalt.

5. A composition as defined in claim 1 wherein the composition has been cured with a curing agent in an amount within the range of 1 to 20% based on the weight of the polyester of the asphalt composition.

6. A reinforced composite comprising a chemically-modified asphalt as defined in claim 1 as a continuous phase, and a reinforcing filler distributed throughout the continuous phase as reinforcement therefor.

7. A composite as defined in claim 6 wherein the filler is formed of glass fibers.

8. A composite as defined in claim 7 wherein the glass fibers contained on the surfaces thereof comprise a thin size coating containing an organo silicon compound as an anchoring agent.

9. A composite as defined in claim 6 wherein the chemically-modified asphalt is cured.

10. A method for preparing a chemically-modified asphalt composition comprising the steps of reacting an asphalt with a vinyl aromatic monomer, and then reacting an organic polyester with the reaction product to form a polyester-modified asphalt composition.

* * * * *